M. COOPER.

PLOW.

No. 10,007. Reissued Jan. 10, 1882.

Attest:

L. Walter Fowler,

Warren Parsons

Inventor;

Mark Cooper by A. H. Evans & Co.

his attys.

N. PETERS, Photo-Lithographer, Washington, D. C.

UNITED STATES PATENT OFFICE.

MARK COOPER, OF SPARTANBURG, SOUTH CAROLINA.

PLOW.

SPECIFICATION forming part of Reissued Letters Patent No. 10,007, dated January 10, 1882.

Original No. 247,989, dated October 4, 1881. Application for reissue filed December 22, 1881.

*To all whom it may concern:*

Be it known that I, MARK COOPER, of Spartanburg, in the county of Spartanburg and State of South Carolina, have invented certain Improvements in Plows; and I hereby declare the following to be a full, clear, and exact description thereof, reference being had to the accompanying drawings, making part of this specification, in which—

Figure 1:
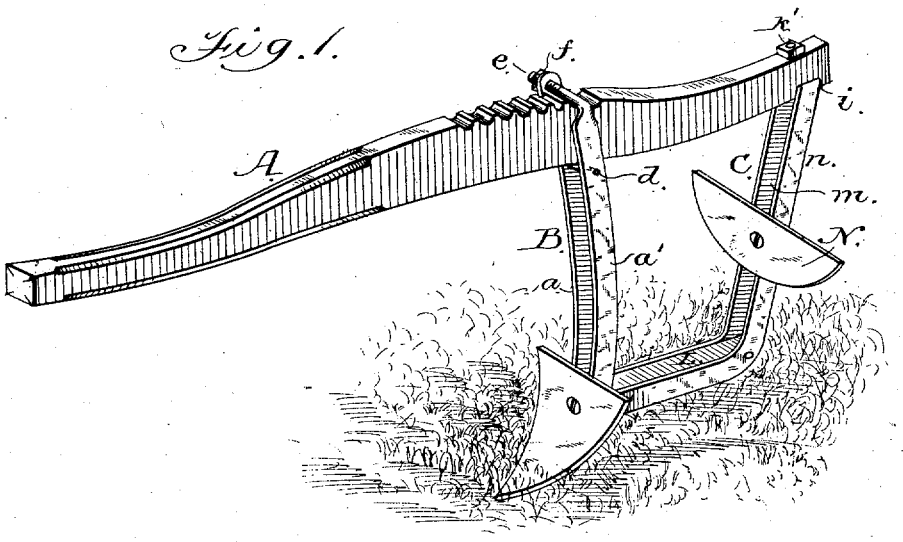
Figure 2:
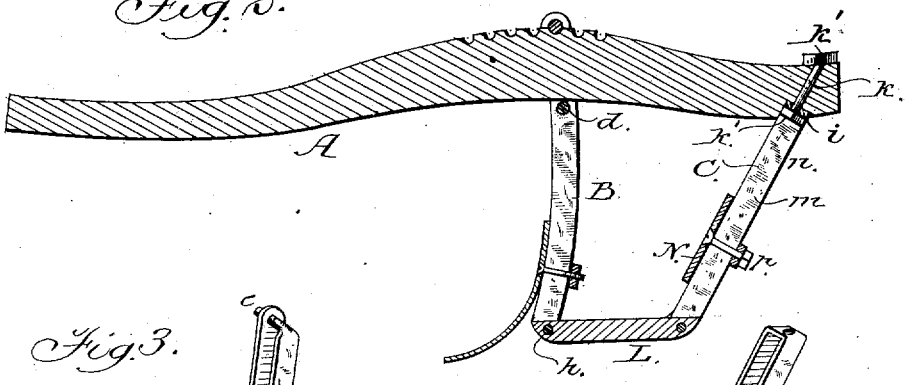
Figure 3:
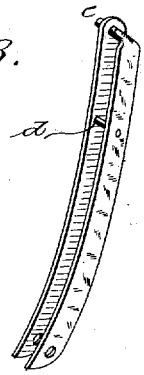
Figure 4:
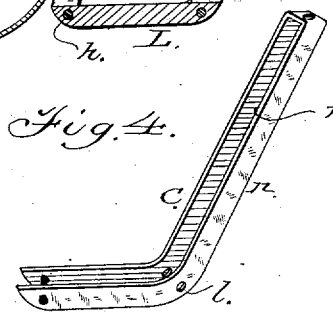

Figure 1 is a perspective view of the plow. Fig. 2 is a vertical section. Figs. 3 and 4 are details to be referred to.

My invention consists in the combination of devices, as hereinafter described and claimed.

In order that those skilled in the art may make and use my invention, I will proceed to describe the manner in which I have carried it out.

In the said drawings, A represents the beam of the plow, B the standard, and C the land-slide and back brace.

The standard is constructed of two bars, *a a'*, which lie parallel, and at their lower ends are curved slightly forward to conform to the curvature of the plow D. A short distance below the beam a bolt, *d*, holds the pieces *a a'* together. Above the beam the piece *a* is bent down over the top of the beam at right angles, and has its end *e* drawn out into a screw-bolt, which passes through a hole in the upper end of piece *a*, and a nut is passed on the threaded end of *a*, as seen at *f*. At their lower extremities there is pivoted between pieces *a a'* the end of the back brace and land-slide by means of a riveted bolt, *h*.

The land-slide and back brace is made of a flat metal bar, *n*, which is bent at the center to form a loop, and leaving the rectangular portion *i* to rest against the under side of the beam, to which it is secured by means of a bolt, *k*, which passes through it and the beam, and is secured by means of a nut, *k'*. The two halves are then brought down to a point, *l*, where they are bent to a horizontal position, as shown, and carried forward until they pass between the lower ends of the bars *a a'*, and are secured to the ends of said bars, together with an intervening solid shoe or piece, L, by means of bolt *h*. At the bend *l* another bolt secures the shoe L to the two laps of the metal bar *n*. This construction leaves a long open slot, *m*, between the shoe L and the beam between the sides of the back brace. In this slot moves or is fitted the shank of a grass-cutter, N, which is secured at any desired height by means of a nut, *p*.

Having thus described my invention, what I claim as new, and desire to secure by Letters Patent, is—

1. The plow-standard constructed of the pieces *a a'*, the piece *a* being bent at right angles above the beam and passing through the perforation in the upper end of piece *a'*, in combination with and clasping the beam A and the bolt *h*, all constructed and operated as and for the purpose set forth.

2. The double rear brace, C, adapted to receive a movable grass-cutter or other attachment, N, secured by bolt and nut *p*, and its lower portion bent to form the land-slide, in combination with and pivoted to the lower end of the front double standard, B, at hole *h*, all constructed, arranged, and operated substantially as set forth.

MARK COOPER.

Witnesses:

H. B. APPLEWHAITE,

WARREN PARSONS.